United States Patent [19]

Laing

[11] 3,893,506

[45] July 8, 1975

[54] DEVICE FOR THE ABSORPTION AND EMISSION OF HEAT

[76] Inventor: Nikolaus Laing, Hofener weg 35 bis 37, 7141 Aldingen near Stuttgart, Germany

[22] Filed: Sept. 15, 1972

[21] Appl. No.: 289,628

[30] Foreign Application Priority Data
Sept. 17, 1971 Austria .............................. 8082/71

[52] U.S. Cl. ...................... 165/18; 165/49; 165/40; 165/104; 165/105; 126/271; 237/1 A; 236/101
[51] Int. Cl. ............................................ F24d 11/00
[58] Field of Search ............. 165/105, 18, 104, 107, 165/49, 53, 48, 50; 126/271; 237/1 A

[56] References Cited
UNITED STATES PATENTS

| | | | |
|---|---|---|---|
| 1,945,975 | 2/1934 | Munters | 165/105 X |
| 2,342,211 | 2/1944 | Newton | 165/18 |
| 2,396,338 | 3/1946 | Newton | 165/18 |
| 3,018,087 | 1/1962 | Steele | 165/105 |
| 3,262,493 | 7/1966 | Hervey | 165/18 X |
| 3,399,664 | 9/1968 | Suhay | 126/271 |
| 3,414,050 | 12/1968 | Anand | 165/105 X |
| 3,532,158 | 10/1970 | Hiebert | 165/105 X |
| 3,548,930 | 12/1970 | Byrd | 165/105 |
| 3,735,806 | 5/1973 | Kirkpatrick | 165/105 X |

*Primary Examiner*—Albert W. Davis, Jr.
*Attorney, Agent, or Firm*—Pennie & Edmonds

[57] ABSTRACT

In a device for the absorption and release of heat, two large-surface elements are provided, of which one emits the heat and acts as a heat source and the other absorbs the heat and acts as a heat sink. These two large-surface elements are joined to each other with pipes connected in parallel which are in good heat conducting contact with the large-surface elements. The internal space of the pipes is closed and filled with a heat carrier in a state of saturated vapour within the operating range.

20 Claims, 11 Drawing Figures

3,893,506

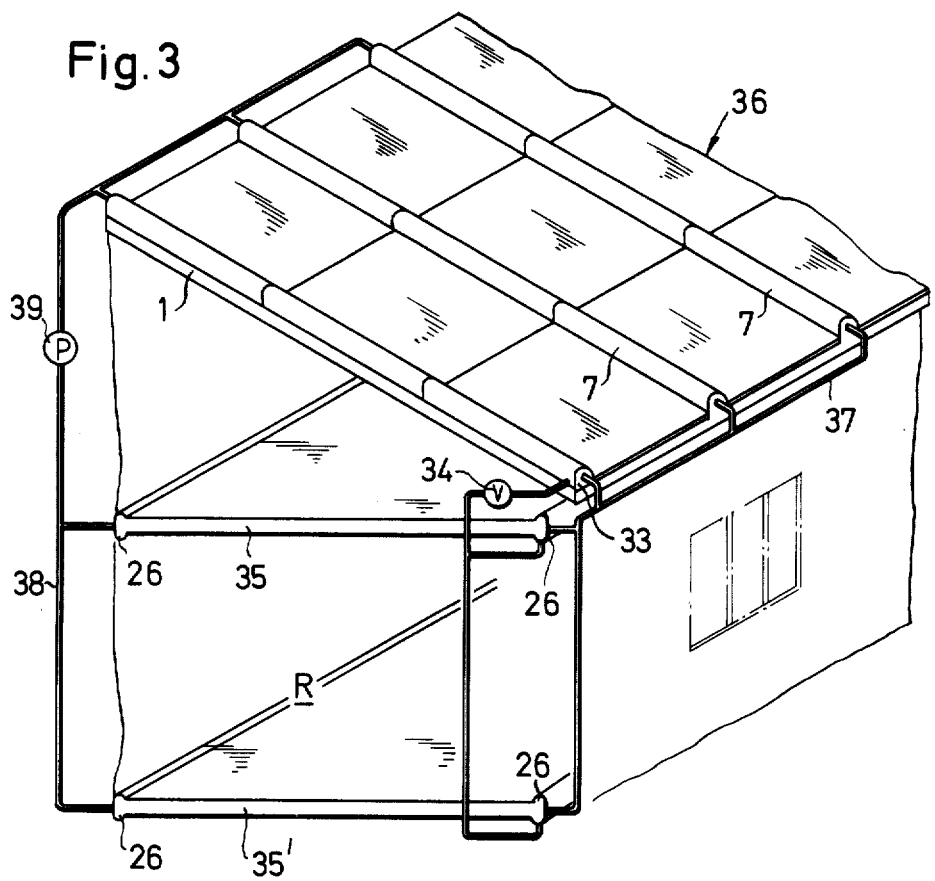
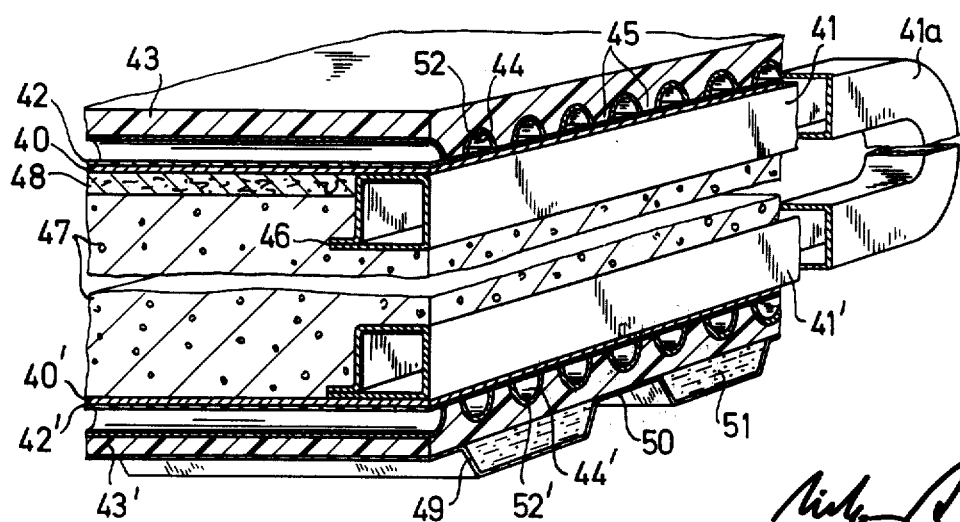

PATENTED JUL 8 1975　　3,893,506

SHEET　　3

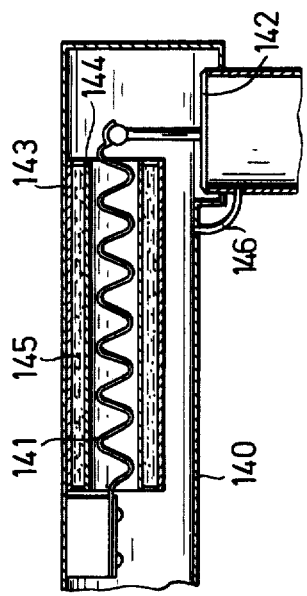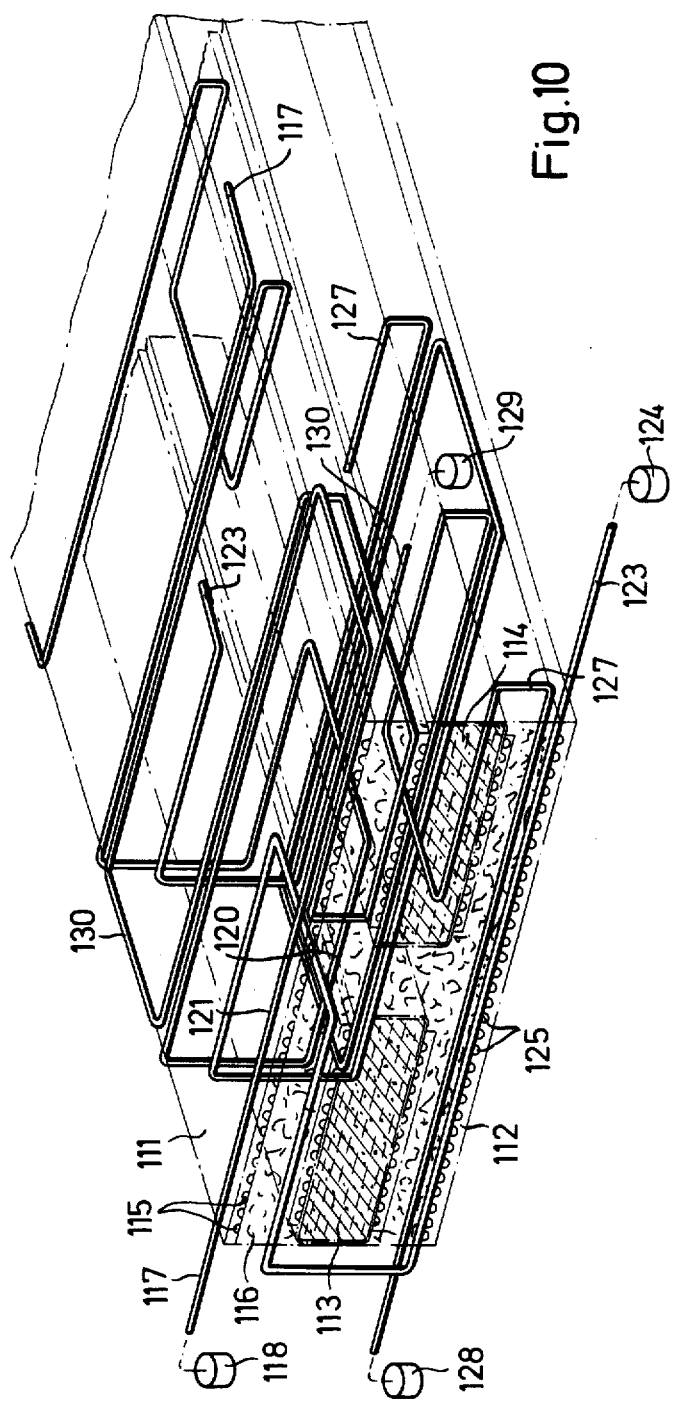

3,893,506

DEVICE FOR THE ABSORPTION AND EMISSION OF HEAT

BACKGROUND OF THE INVENTION

All construction materials have three thermal properties, the magnitude of which is of decisive significance in heat engineering and climatic conditioning, namely:
a. Heat conductivity
b. Heat capacity
c. Radiation behaviour It is known that, for example, aluminium rods, at least so long as they are clean, are hotter than the ambient air by only a few degrees whilst bitumen roofs may be 50° hotter. Furthermore, it is known that rooms in light-weight buildings with walls of high specific strength material are subject to large daily temperature fluctuations, whilst the temperature in rooms with walls and roofs of large thickness have only a small temperature variation.

On the other hand, it can be stated that a high-quality insulation does not always have beneficial effects. For example, the inside temperature of houses in southern regions is often uncomfortably low because, during the cold season, the walls do not permit solar heat to penetrate inside. Conversely, the room temperature in such houses does not sink at night during the summer, as desired.

STATE OF THE ART

Building panels have already been proposed which enclose a hollow space bounded on all sides, containing the saturated vapor of a heat carrier, wherein the return circulation of the condensate from the heat source to the heat sink is possible only in one sense. These building panels are suitable for the insulation and climate control of rooms which are separated, for example, from the free outside space only by this building board. However, it is not possible with this known arrangement to place the heat source and the heat sink at a large distance from each other or even structurally independently of each other. In addition, it has been found impractical for many purposes to make building panels as gas-tight hollow bodies.

THE OBJECTS OF THE INVENTION

The invention has, therefore, the aim of providing building construction elements the load carrying parts of which are made, for example, of concrete, applicable in structures above and below ground, e.g. shells for covering buildings, coverplates for underground railway tunnels, pavements for roads, steps for staircases, wall elements for dwelling houses and others, which are provided with devices to conduct heat flows through the construction material from one surface to the other. With this approach, the invention has the purpose of combining panels such as building boards, shells, wall elements, walls, roofs, walkway coverings etc., (for convenience hereafter called panels) with thermal conduction elements in such a way that, with the help of additional means, heat flow between the surfaces can be controlled as to heat flow direction and/or heat flux magnitude. Thus, for example, it is desirable, in warm regions, to control the heat flow originating from the sun as to penetration, through the roof and the walls, whilst conversely controlling the escape of the heat accumulated inside as to its escape to the outside during the cool hours of the night.

For convenience of description, the word 'panel' as used herein is intended to include boarding, sheet material as for roofing, and other construction elements which are of a fundamentally flat form, i.e. superficial area on two opposite sides which is large as compared to the thickness of the element. Further the term 'outer' is used to indicate that surface of such an element which is normally exposed to the sky, whilst 'inner' conversely indicates the side which is normally exposed within the building structure.

DESCRIPTION OF THE INVENTION

According to the invention, in a device for the absorption of solar energy and/or for the emission of heat into free space, wherein a large-surface element faces this free space and another surface element is exposed to an exchange of heat with a medium to be heated and/or to be cooled, so that one element acts as a heat absorbing sink and the other element as a heat emitting source, several pipes connected in parallel are provided between the two large-surface elements, which pipes are filled with a fluid heat carrier present both in the gaseous and the liquid phases. The large-surface elements are preferably embodied in the form of sheets of high thermal conductivity and the pipes are preferably arranged at equal spacings parallel, to each other and are firmly joined or integrated in the elements in good thermal contact therewith. In an advantageous embodiment, the pipes are so installed that the fluid heat carrier condensing at the heat source, i.e. the element which emits heat to the outside, flows back under gravity through the pipes towards the element which forms the heat sink and so constitutes the boundary of the room to be cooled. If, for example in a cold climate, it is desired that the solar heat is always conducted from the free outer space towards an inside room without permitting the heat from the inside room to flow towards the outside, and considering the case when, for example, vertical wall elements are concerned, the pipes which enclose the heat carrier fluid (saturated vapour) are so installed between the two wall elements that the condensate liquid can flow by gravity towards the heat sink, i.e. towards the large-surface element which faces the free outer space.

If, finally, e.g. in temperature climates, the heat flow sense is occasionally to be reversed and the converse effect is required, the invention provides that the insides of the vapour pipes be lined in a manner known per se, with a coating which conveys the heat carrier condensate in the vapour pipe by capillary forces. In this instance, the coating acts as a conveying device. In one embodiment, the inside of each pipe is connected, according to the invention, with a condensate space, the temperature of which can be varied through a range larger than the operating temperature range. If an interruption of the heat conduction is desired, the condensate space is cooled sufficiently to ensure that virtually the entire heat carrier contents of the pipe enters into the condensate space, whereby the heat transfer by latent heat effect is interrupted. By suitable means described below, a range of control of rate of heat transfer can be accomplished. In order to control the heat conduction, the invention includes the provision of external thermostats. An even more effective method is one in which the meteorological variables, e.g. the pressure gradient or the forecasting data, are used to monitor or perform the control. The application of this method permits the optimum utilisation of the natural heat source and/or heat sink, in other words, solar radiation and space blackness. These free-of-charge heat flows can be utilised not only for the heating and/or cooling of rooms but also for preventing icing on roads, rails, steps of staircases, balconies and roofs. In using heat storage devices, the invention envisages not only the utilisation of the heat storage capacity in concrete and other construction materials by the accumulation of sensible heat but also latent heat storage, which has the advantage, compared with the storage of sensible heat, that the temperature of the storage device does not vary during the storing process. It is therefore envisaged, insofar as the device according to the invention is to be used for modifying the temperature of a room, to provide storage substances on the side exposed to the room or, insofar as the device is to be utilised to ensure freedom from ice, to provide storage substances underneath a pavement, which storage substances are in good thermally conductive contact with the pipes and deliver their heat of crystallization at a specified temperature. Suitable latent heat storage substances are above all metal salt hydrates with inoculation agents and supporting framework additives.

The essential advantage of the device according to the invention lies in the fact that, for heat flow rectification in flat elements of suitable shape, it is no longer necessary to use hollow panels which must be absolutely gas tight; instead there are provided highly thermally conducting sheets exposed to the free outside space and highly thermally conducting sheets facing the inside room or equally, other components serving the exchange of heat, i.e. finned components, interconnected by means of heat pipes which can be made vacuum tight much more easily than large-surface boards, subject to large thermal expansion.

Suitable heat carrier fluids which, in the relevant range of operating temperatures, are chlorine fluoride hydrocarbon, chain hydrocarbons, ketones, azeotropic mixtures of water and water soluble hydrocarbons, trifluoro-trichloro-ethane, tetrafluoro-dichloro-ethane and other similar substances, having the required thermal properties and suitable substances for thermal storage capable of storing latent heat are disodium-phosphate dodecahydrate, sodium sulphate decahydrate, lithium nitrate trihydrate, a mixture of 69 parts by weight of sodium sulphate decahydrate and 31 parts by weight of potassium chloride, a mixture of 77 parts by weight of sodium sulphate decahydrate and 25 parts by weight of ammonium chloride and similar substances.

The invention is described by way of example with the help of figures.

FIG. 3 shows diagrammatically the arrangement of the large-surface elements in a dwelling house.

FIG. 4 shows a cutaway portion from a building panel with a controllable heat flow rectification effect.

FIG. 10 shows a device according to the invention containing several heat conduction circuits in a cutaway portion.

FIG. 11 shows a control valve for a device according to the invention.

Figure 1:
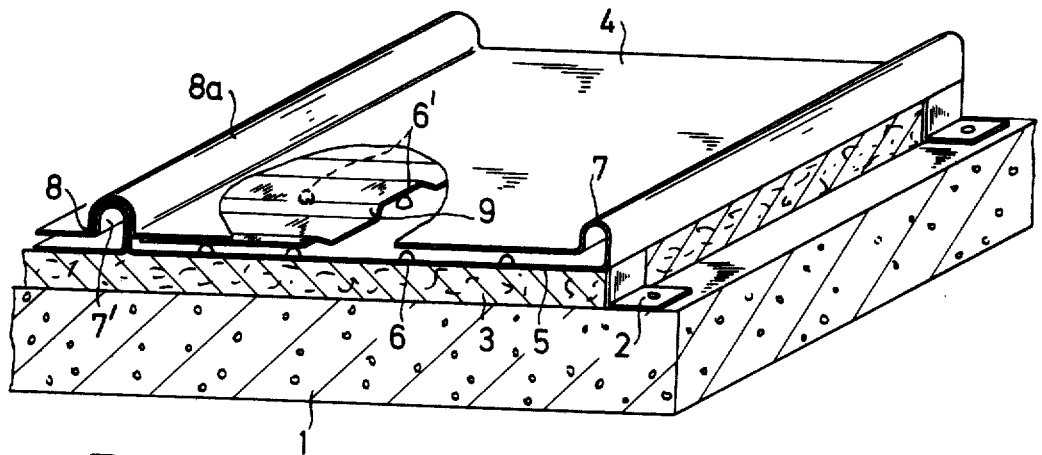
FIG. 1 shows a panel suitable for the construction of a large-surface roof element for a device according to the invention.

FIG. 1 shows a panel for use preferably as a roof covering which acts as the large-surface element of a device according to the invention. Metal sheets forming panels are mounted with brackets 2 on a concrete baseplate 1, so that the panels assume the positions shown in FIG. 3. An insulating layer 3 is placed between the concrete baseplate 1 and the panel. The panel itself is designed as a double wall and is built up of sheet metal, the outer facing surface 4 and inner facing surface 5 of which are smooth. A large number of buttons 6 serve as spacers to maintain the distance between the sheets 4 and 5. The sheets 4 and 5 enclose between them along one margin a tubular section 7 which serves as a fluid channel. At the other parallel margin the sheets 4 and 5 are bent over at 8a as a U-section 1 and are seam welded along the seam 8. The margin 8a meshes with the tubular edge 7' of the next plate. A lamina 9 of absorbent paper is arranged between the sheets 4 and 5. The paper hangs between adjacent rows of buttons 6 and 6' so that it touches both the upper wall 4 and the lower wall 5 between the rows of buttons. The metal sheet 4 is provided externally with a surface which, in the range of heat radiation of 9 microns, has the highest possible thermal emissivity. In the range of about 0.5 microns, in applications where the main purpose is cooling, the emissivity should be as low as possible which can be achieved, for example, by applying a coating of titanium dioxide enamel, whilst in applications in which preferably heat is to be won the radiation is below 0.5 microns, there will preferably be used carbon black matt paints. In principle, however, lamina synthetic resin is also suitable as a material for the surface, particularly when this is to be made vacuum tight by lamination with an aluminium foil. Finally, sheets for use in the invention can also be extruded; the buttons 6 may be formed whilst the extruded material has not yet solidified.

Figure 2:
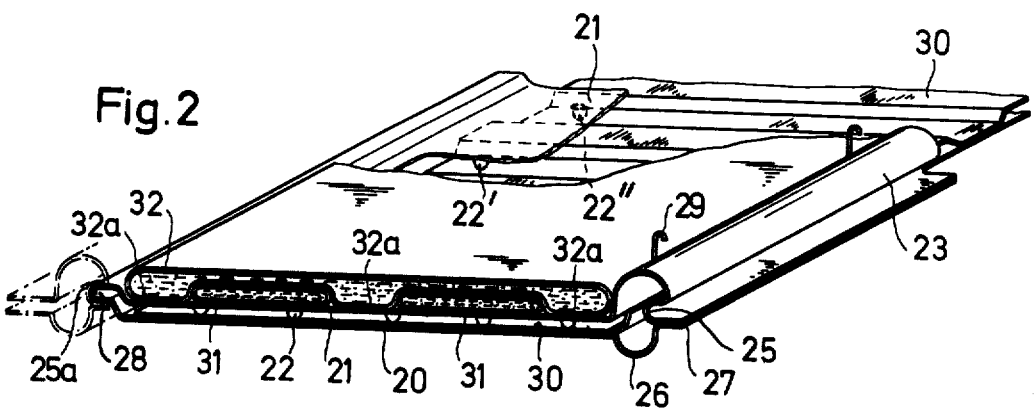
FIG. 2 shows a panel suitable for the construction of a large-surface element exposed to an inside room for a device according to the invention.

FIG. 2 illustrates a panel in a second embodiment of the invention, when the panel which is in the form of a large surface element is to be mounted as a partition inside a building, as a ceiling or a wall element. The construction is, in principle, the same as that of a panel according to FIG. 1. By means of a folded sheet of metal or foil strip, a hollow body is formed resembling the form as described above. In this example the sheet 20 presenting the inner surface is smooth whilst the sheet 21 having the outer surface has the buttons 22. The pipe section 23 has a profile with a groove-shaped identation 25. Fluid channels 26 are formed along the margins of sheet 20 in which the liquid heat carrier accumulates when the plate is arranged horizontally. The folded sheet is welded along a seam at 27.

The folded edge 28 is formed as a projection which dovetails into the groove-ahaped indentation 25a of the adjacent panel. Hooks 29 serve for the suspension of the panel from the ceiling of a room. Between the rows of buttons 22' and 22", which are seen in the cutaway section, a corrugated lamina 30 made of absorbent paper is provided, the corrugations of which touch both the upper sheet 21 and the lower sheet 22. Pipes 31 and 32, formed of thin conductive foil or sheet 22 are bonded to the upper sheet. The pipes 31, closed at their ends, are filled to form a heat storage body having a thermal storage substance with a phase-change temperature which must be above the dew point when the humidity of the air is normal. Temperatures between 17° and 19° C. have been found to be suitable as phase-change temperatures for the cooling of rooms. The pipes 32 which touch the sheet 21 in three areas 32a (in the example) contain the latent heat storage substance, the crystallisation or phase-change temperature of which lies advantageously between 27° and 33°.

FIG. 3 includes a cross-section through part of a building in which a device according to the invention is installed including panels 35, 35' which are arranged in two storeys and are according to FIG. 2, as well panels according to FIG. 1 being arranged as a roof 36. The pipe sections or channels 7 and pipe sections 23 of laterally adjacent panels are interconnected via pipes 37. The channels 26 are connected with the inside of the roof panel 36 via a pipeline 38 in which a condensate pump 39 is arranged. A condensate collector 33 is connected with the inside of the panel 35 via a valve 34. If heat withdrawal (i.e. cooling) is desired from the room R, the valve 34, which may be thermostatically controlled, is opened. The room heat heats the panels of the ceilings 35 and 35' which deliver heat to the storage substance in the pipes 31. The amount of storage substance is so chosen that only the heat quantity due to several days heating is fully taken up latently by the entire storage substance within 31. During the night, the sheet 36 of the roof which faces space, radiates energy so that this sheet cools down greatly. The inside of the panels and the pipes 37 and 38 are filled with the saturated vapour of a fluid, preferably an azectropic mixture with methanol. Excessive condensate collects in the channels 26. Condensation takes place due to cooling between the sheets of the element 36. The saturated vapour pressure reduction caused thereby leads to an evaporation in the hollow panels 35 and 35' whereby the panels cool down. The stored heat of crystallisation is thereby withdrawn from the storage substance in the pipes 31. Condensate in the collectors 36 runs back through the valves 34 into the elements 35 and 35' so that the thermodynamic cycle is closed. The system acts in this mode for emission of heat into free space as heat stored by the storage substance in 31 during the day is radiated into outer space. While the heat of the incident radiation during the day is held back by the insulation 3, (and possibly further insulations) from penetrating into the inner space. At the end of the summer, the valves 34 are shut. The condensate from the channels 26 of the panels 35 and 35' is conveyed into the panels 36 by the pump 39, or in an alternative arrangement by means including squeezable wicks (not illustrated) either of which acts as a conveying device. This condensate is evaporated due to solar heat and flows through the pipes 37 and the pipe sections 23 into the panels 35 and 35'. Condensation, with consequent heat release, takes place there. The storage substance in 32 is thus charged by the solar heat which also radiates through the inner surface uniformly via the surface sheets 20 into the room. The condensate so formed, is once again, conveyed upwards by means of the pump 39 (or by surface tension) so that the cycle is closed.

When the valve 34 is shut and the pump 39 is not switched on, the system remains ineffective. Heat in any substantial quantity neither enters the internal space nor is withdrawn from it.

FIG. 4 shows diagrammatically a cross-section through a cutaway portion of a device according to the invention. The roof is formed by panelling made of steel sheet or preferably, aluminium sheet 40. Pipes 41 forming fluid channels are filled with saturated vapour and arranged with regular spacings between them, and parallel to each other and to the roof slope and are in good thermal contact with the sheet 40. The outer side of the sheet 40 is covered with a coating 42 of a thermoplastic synthetic resin. A synthetic resin sheet 43 which is provided with secondary fluid channels 44 running at right angles to the pipes 41, is placed above the outer side. The webs 45 between the channels 44 are attached to the coating 42 in a vapour-tight and permanent manner.

The secondary channels 44 are closed at their ends. The inside of a channel 44 is lined with an absorbent layer, and is filled with the heat conveying fluid in the form of saturated vapour and a small amount of the condensate. The pipes 41 are folded of sheet metal and welded along the seam 46. The seam region forms a recess in the concrete slab 47. An insulating lamina 48 is arranged between the sheet metal 40 and the concrete 47. The inner surface facing towards the room is built up in the same way in its essential parts. The inner vapour pipe or channel 41', the interior of which communicates via a pipe 41a with the outer vapour pipe or channel 41, in good heat conducting contact with the inner sheet metal 40'. The inner sheet metal 40' is provided with a synthetic resin lining 42'. Here again, a synthetic resin lamina 43' is built up in the same way as described to form channels which are provided on their inside with an absorbent layer 52'. A channelled foil 49 is permanently attached to the synthetic resin lamina 43' along areas 50. A latent heat storage substance 51 with a crystallisation or phase-change temperature of preferably 17° t0 19° is introduced in the trapezoidal section channels so provided. The pipes 41, 41' and the connecting pipe 41a are connected in parallel to a plurality of pipes of the same construction (not shown).

Figure 5:
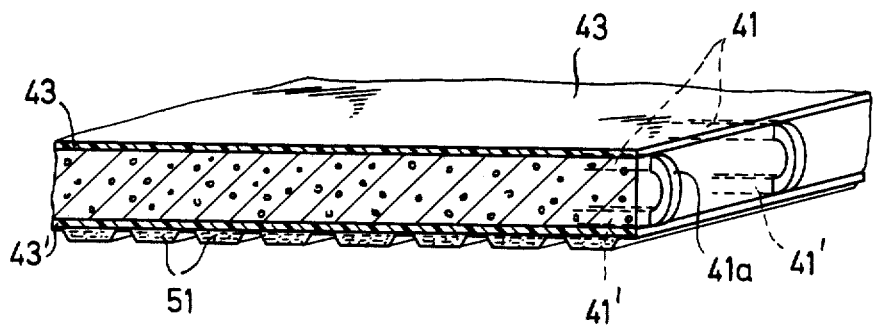
FIG. 5 shows the building panel of FIG. 4 to a smaller scale.

FIG. 5 serves to explain the device according to FIG. 4 and shows, in perspective, a roof panel according to FIG. 4. The vapour pipes 41 are connected to the vapour pipes 41' via the bends 41a. During the hours of the day, the storage substance 51 constituting a latent heat sink is charged by the room temperature and thereby withdraws heat from the room or inner space. During the hours of the night, the synthetic resin lamina 43 which provides the roof surface, due to its physical blackness, radiates energy in the 9 micron region and causes the heat carrier fluid to condense in the channels 44 (of FIG. 4). The condensate in in the inner channel 44' evaporates as soon as a heat gradient arises between the pipe 41' and the latent heat storage substance 51 and condenses again immediately below the pipes 41'. The return of the condensate takes place via the absorbent layer 52' by surface tension. In the vapour pipe constituted generally by 41', 41a, 41, evaporation takes place in the portion 41' and condensation (heat source) in the portion 41. The condensate runs back into the pipe 41'. The amount of storage substance 51 is so chosen that a heat quantity sufficient for a period of several days can be stored so that, even under unfavourable meteorological conditions, e.g. with a fully covered sky, the room cooling effect is not interrupted over such periods.

Figure 6:
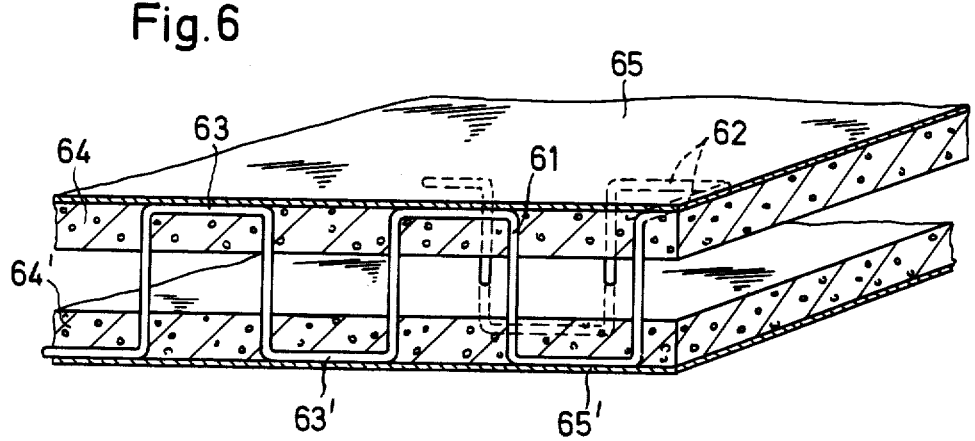
FIG. 6 shows a cutaway portion of a building panel with a meander-shaped heat conduction pipe.

FIG. 6 shows another form of embodiment according to the invention in which the U-shaped sinuously bent pipes or channels 61 containing saturated vapour, are used for heat transfer. A concrete slab 64 is traversed by a plurality of the pipes 61, which are interconnected by means of the transverse pipes or channels 62. Heat flow distributing metal sheets 65, 65' are joined in good thermal contact with the pipes 63. The inside of the pipes 61 is, once again, occupied by saturated vapour and condensate of a fluid heat carrier substance. This arrangement leads to a heat transfer effect from the bottom or inner surface to the top or outer surface and thus, as a rule, from the inside to the outside of a building, whilst heat is not transferred by the fluid in the reverse sense. The pipes between the concrete slab 64 and the concrete slab 64' may act as reinforcing rods.

Figure 7:
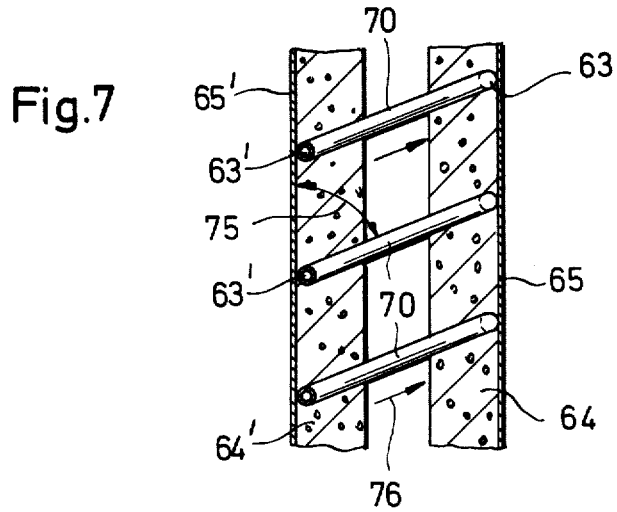
FIG. 7 shows a cross-section through a cutaway portion of a wall panel which is designed similarly to the roof board shown in FIG. 6.

FIG. 7 shows diagrammatically a device according to the invention similar to that of FIG. 6 but adapted to vertical walls, in which the connecting sections 70 of a sinuously bent pipe or fluid channels are not vertical but lie at an acute angle 75 to the wall surface. The heat flux is in the direction of the arrow 76 to whichever pipe section 63 lies higher. The condensate flows back to the surface of sheet 65' via the inclined sections.

The distribution of the heat flow over the surfaces can take place either by means of metal sheet 65, 65', as already shown in the form of the embodiment according to FIG. 1, or less by means of elements 43 as shown in FIG. 4.

Figure 8:
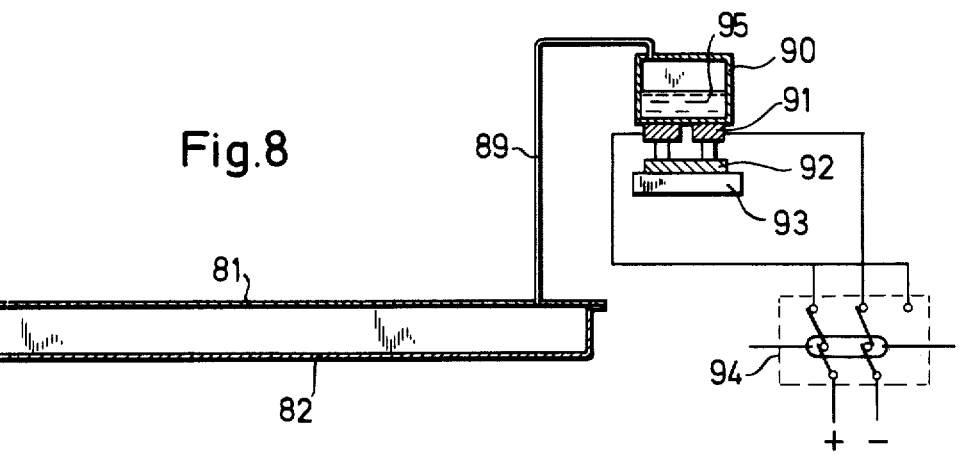
FIG. 8 shows a control device for a heat conduction pipe according to the invention.

FIG. 8 shows diagrammatically a panel or large surface element with surface sheets 81, 82, which communicates with a condensate container 90 via a pipe 89. The temperature of the condensate container is controlled by means of a Peltier element of which one set of electrodes 91 is in good heat conducting contact with the condensate container, whilst the other set of electrodes 92 is in good heat conducting contact with cooling fins 93. The sense of the electric current can be selected by means of a change-over switch 94. When the electrodes 91 are connected as a heat sink, the heat carrier fluid inside the panel 81, 82 condenses until gradually the entire heat carrier is liquified as condensate 95 in the condensate container 90. The thermal conductivity of the panel 81, 82 is therefore greatly reduced. By changing over the change-over switch 94, any desirable partial quantity or even the entire condensate can be evaporated back into the circulation, so that every intermediate value of thermal transfer up to the maximum, can be achieved under control. The manner of control of heat transfer as explained with the help of FIG. 8, is applicable to all devices according to the invention.

Figure 9:
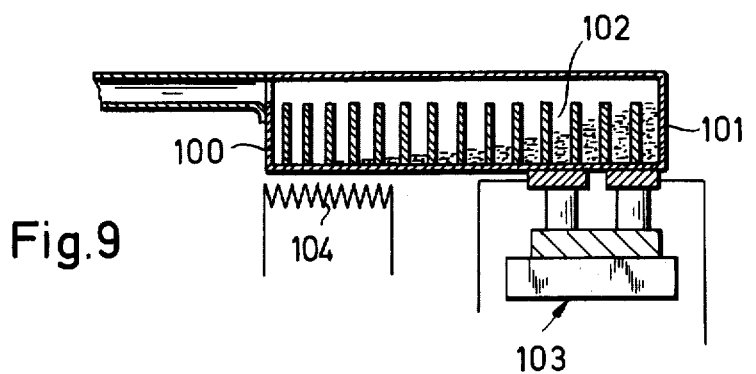
FIG. 9 shows a modification of the control device shown in FIG. 8.

FIG. 9 shows a condensate container modified from that of FIG. 8, in which the amounts of condensate and thereby the heat transfer between the surfaces of 81, 82, is controlled by generating a heat flux between two separated regions 100 and 101 of the concensate container. The condensate is collected in a large number of individual chambers 102. A Peltier element 103 cools one end of the condensate container, whilst the other end is heated by an electric heater 104. The more powerful the heating by this device, the more of the chambers 102 become fully emptied. This arrangement is especially preferred for proportional control thermostats which, for example, sense the ambient temperature. Devices according to FIGS. 8 and 9 can also be adapted for use for the control of the heat flow between the storage substances and the room ceiling or room walls.

FIG. 10 shows diagrammatically a device according to the invention in which four circuits can be controlled independently of each other in order to bring into good heat transfer relationship the outer surface of sheet 111 and the inner surface 112 as well as a container 114 with low-temperature latent-heat storage substances. The roof at 111 consists of a heat conducting material, advantageously built up as shown in FIG. 4. The secondary channels 115, charged with saturated vapour, effect the transfer of the heat flows to the pipes 117 which form fluid channels. The sheet 112 is built up in the same way. An insulating material 116 is placed between the surface sheets. The material 116 insulates the sheet 111 from 112, and from the storage substance containers 113 and 114. The heat pipes follow paths sinuous in two planes. The pipe or fluid channel 117 is connected at one end with the condensate container 118, which corresponds to the container 90 or 101 respectively according to FIGS. 9 and 9, and at the other end (not shown) the pipe 117 is enclosed. A wick lining is provided inside the pipe 117. The region 120 (indicated by broken lines) is connected to the bottom side of the storage substance container 113. When the vapour pipe is charged with saturated vapour by heating of the condensate container 118, condensate forms in the wick, which may take the form of an absorbent pipe lining. This condensate evaporates in the region 121 which is in good thermal contact with the outer roof sheet. The storage substance with a phase-change temperature of, say 36° is charged by the latent heat of condensation of the heat carrier fluid in the section 120.

If heat is required inside the building, the pipe fluid channel 123 leading from the condensate container 124 is charged with saturated vapour. The pipe 123 connects the top side of the storage container 113 with the inner surface sheet 112, where the heat is uniformly distributed by the channels 125 which contain saturated vapour.

In summer, during the day, heat is supplied along the pipe 127 to the low-temperature storage substance in the container 114 which has a phase-change temperature of, say, 17°. The heat is withdrawn from the sheet 112 having the inner surface. This process takes place provided that the condensate container 128 has been heated. At night, the condensate container 129 is heated so that the pipe 130, which is in contact with the top side of the storage substance container 114 and the roof sheet 111, is charged with saturated vapour and condensate, whereby the heat stored during the day in the storage substance container 114 is supplied the roof sheet 111 and radiated by it. The pipe systems 127 and 130 need no inside lining because the condensate always gravitates back to the heat source.

By means of this device, the heating and cooling of the interior of a building can be accomplished by the utilisation of solar energy. The control can be performed by on-and-off switching thermostats with the help of a device similar to that in FIG. 8 or by modulating thermostats according to FIG. 9, and can be made fully automatic.

According to the invention, a pump as at 39 in FIG. 3 can be substituted for the capillary wick or pipe lining capable of suction and a valve according to 34 in FIG. 3 for the condensation in the containers 118, 124, 128, 129 and vice versa. Furthermore, externally actuated or bi-metal controlled valves may be utilised for the interruption of the vapour flow in the vapour pipe.

FIG. 11 shows a valve according to the invention in a pipe 140 charged with saturated vapour. The valve is actuated by means of a bi-metal strip 141. In a heat rectifier arrangement, heat is to be conducted, e.g. from rooms of a building to the outer surface of the roof only during the hot season of the year. In order to interrupt this effect in winter, the bi-metal 141 is so adjusted that, at a temperature which lies below the desired room temperature, the valve 142 is shut ageinst its seat. In order to prevent shutting during a short temperature drop below the limit, the invention envisages the arrangement of the bi-metal strip formed as a corrugated element inside a double-walled tube, which consists of the walls 143 and 144 the intermediate cavity of which is filled with a heat-storage substance 145, the phase-change temperature of which is near the desired temperature inside the building. The amount of storage substance is so chosen that undercooling periods of less than 12 hours do not shut the valve 143, so that the otherwise automatic cycle is interrupted only when the weather cools down to constantly lower level, e.g. autumn. A by-pass pipe line 146 serves for the return of the condensate and has such a small bore that no vapour flow with a disturbing heat content flows past the valve.

I claim:

1. A combination of a building structure having an outer roof area facing the free space exterior of the structure and an inner area facing the interior of the structure and a device for the absorption of solar energy or emission of heat into the free space and for thermally conditioning the inner area, said device comprising a large surface first element forming part of said roof area and having therein a plurality of fluid channels connected in parallel in good heat conducting contact with said first element, a large surface second element forming a part of said inner area having a plurality of fluid channels connected in parallel in good heat contact with said second element, a heat storage body associated with one of said elements whereby heat may be transferred between the one element and said heat storage body, a saturated vapor of a heat carrying fluid and a condensate of said vapor contained within said channels, piping means connecting the channels of said first element with the channels of said second element whereby heat may be transferred between said elements by said saturated vapor when one of said elements acts as a heat source and the other said element acts as a heat sink and a conveying device for conveying condensate of the heat carrying fluid from said second element to said first element through said channels when said device is absorbing solar energy.

2. A combination according to claim 1 having in addition a further heat storage body and wherein said heat storage body and said further heat storage body are both associated with said second element with some of the channels of said second element communicating with the heat storage body and with the remainder of the channels in said second element communicating with said further heat storage body.

3. A combination according to claim 1 wherein the element acting as a heat source comprises said first element and the element acting as a heat sink comprises said second element.

4. A combination according to claim 1 wherein the element acting as a heat sink comprises said first element and the element acting as a heat source comprises said second element.

5. A combination according to claim 1 having in addition an adjustable throttling device in said piping means for regulating flow of heat carrying fluid between the channels of said first and said second elements.

6. A combination according to claim 5 having in addition a temperature control actuator for adjusting said throttling device.

7. A combination according to claim 6 having in addition a casing having a high heat capacity surrounding said temperature control actuator.

8. A combination according to claim 1 wherein said first element comprises a hollow body the inside of which connects with the fluid channels within said first element.

9. A combination according to claim 8 where the first element comprises a sheet metal hollow body having two opposing walls separated and supported with respect to each other by buttons.

10. A combination according to claim 1 wherein said heat storage body comprises disodium phosphate dodecahydrate.

11. A combination according to claim 1 wherein said heat storage body comprises sodium sulfate decahydrate.

12. A combination according to claim 1 wherein said heat storage body comprises lithium nitrate trihydrate.

13. A combination according to claim 1 wherein said heat storage body comprises 69 parts by weight of sodium sulfate decahydrate and 31 parts by weight of potassium chloride.

14. A combination according to claim 1 wherein said heat storage body comprises 75 parts by weight of sodium sulfate decahydrate and 25 parts by weight of ammonium chloride.

15. A combination according to claim 1 wherein said heat carrying fluid comprises chlorine floride hydrocarbon.

16. A combination according to claim 1 wherein said heat carrying fluid comprises a chain hydrocarbon.

17. A combination according to claim 1 wherein said heat carrying fluid comprises a ketone.

18. A combination according to claim 1 wherein said heat carrying fluid comprises isotropic mixture of water and water-soluble hydrocarbons.

19. A combination according to claim 1 wherein said heat carrying fluid comprises trifluoro-trichloroethane.

20. A combination according to claim 1 wherein said heat carrying fluid comprises tetrafluoro-dichloroethane.

* * * * *